United States Patent [19]

Schiller et al.

[11] Patent Number: 4,581,760
[45] Date of Patent: Apr. 8, 1986

[54] FINGERPRINT VERIFICATION METHOD

[75] Inventors: Michael Schiller, Riverdale; Emmily S. Ginsberg, Scarsdale, both of N.Y.

[73] Assignee: Fingermatrix, Inc., North White Plains, N.Y.

[21] Appl. No.: 531,766

[22] Filed: Sep. 13, 1983

Related U.S. Application Data

[63] Continuation-in-part of Ser. No. 489,249, Apr. 27, 1983, abandoned.

[51] Int. Cl.⁴ .............................................. G06K 9/00
[52] U.S. Cl. .......................................... 382/4; 382/34; 382/48
[58] Field of Search .................... 382/2, 4, 5, 34, 45, 382/48

[56] References Cited

U.S. PATENT DOCUMENTS

| | | | |
|---|---|---|---|
| 3,944,978 | 3/1976 | Jensen et al. | 382/4 |
| 4,246,568 | 1/1981 | Peterson | 382/4 |
| 4,334,241 | 6/1982 | Kashioka et al. | 382/48 |

Primary Examiner—Leo H. Boudreau
Attorney, Agent, or Firm—McAulay, Fields, Fisher, Goldstein & Nissen

[57] ABSTRACT

An input fingerprint image consists of ones and zeros pixels representing light and dark pixels which in turn correspond to ridge and valley formations. This image is compared with a reference file fingerprint to verify the identity of the input fingerprint. The reference file has two relatively small segments which are subfields of the entire field of pixels that constituted the original fingerprint image for the individual involved. Two substantially larger domain subfields are extracted from the input fingerprint image. The center of each segment corresponds to the center of a respective one of the domains. Each segment is scanned over its corresponding domain to determine the position of maximum ones correlation and maximum zeros correlation between each segment and its corresponding domain. These four positions together with the correlation values associated with each of these four positions are subjected to various criteria to provide positive or negative verification of the input image relative to the reference file. These criteria include (a) positional closeness to one another, (b) exclusion of the positions from a predetermined border of the domain, (c) closeness of the correlation values of certain of the positions, and (d) magnitude of the sum of the ones correlations and zeros correlation for certain of the positions.

32 Claims, 4 Drawing Figures

FINGERPRINT VERIFICATION METHOD

REFERENCE TO RELATED APPLICATIONS

This application is a continuation-in-part of Patent Application Ser. No. 489,249 filed Apr. 27, 1983 and entitled Fingerprint Verification Method, now abandoned.

BACKGROUND OF THE INVENTION

The present invention relates to a fingerprint verification method for use in an access control system and more particularly to a fingerprint verification method which is fast, relatively inexpensive and has a low identification error rate.

Access control systems which use a fingerprint of an individual as the basis for verifying the identity of the individual have been proposed. These systems store an enrollment or reference fingerprint. Each time access is desired, a verification fingerprint scan is taken and compared to the enrollment or reference print. Based upon the comparison, access is granted or denied.

The fingerprint verification method used in the access control system must be capable of quickly and inexpensively comparing the verification scan to the reference fingerprint.

In many systems, it is essential that the system have a very low type I error. A type I error is the incorrect rejection of an individual seeking access. The installation may tolerate a somewhat higher type II error. Type II error is the incorrect admission of an individual seeking access. Nonetheless, it is also desirable to keep type II error low.

If the method used for comparing the input fingerprint and the file fingerprint involves the entire fingerprint, the result may be quite low in type I and type II errors but such a method tends to be too slow and too expensive for large scale control systems.

Accordingly, it is a purpose of the present invention to provide a fingerprint verification method having a very low incidence of type I error which operates at high speed and low cost.

BRIEF DESCRIPTION

One embodiment of the fingerprint identification technique of this invention uses two relatively small reference segments which are extracted from an enrolled fingerprint image. The reference segments are scanned across a somewhat larger domain of an input fingerprint image to establish positional correlation between enrollment image and input image.

The enrolled fingerprint is provided as an image having a series of light and dark pixels representing respectively ridge and valley zones. The light pixels are stored as having a "ones" value and the dark pixels are stored as having a "zeros" value. The fingerprint image used in the method of the present invention can be generated by known optical scanning techniques such as that described in U.S. Pat. No. 4,322,163.

When access is desired, a verification or input fingerprint scan is made to provide an input image. Predetermined domans from the input image and predetermined segments from the enrolled image are compared to locate (a) the maximum correlation between the ones pixels in the reference segments and the ones pixels in the corresponding domain subfields of the input image and (b) the maximum correlation between the zeros pixels in the reference segments and the zeros pixels in the corresponding domain subfields. Specifically, first and second 32×32 pixel reference segment subfields from the enrollment image are scanned across respective first and second 91×91 pixel domain subfields from the input image to locate positions of highest correlation.

These reference segment positions of highest correlation are subjected to a series of verification criteria in order to determine whether or not the person desiring access is the same person from whom the enrollment print was taken. The verificationcriteria includes position closeness of the highest correlation values and relative magnitudes of the correlations at those positions.

The cascading of the requirement that two separate fingers of the same individual be identified improves type II error. Permitting access if verification is made on any one of multiple attempts improves type I error.

DESCRIPTION OF THE PREFERRED EMBODIMENTS

Figure 1:
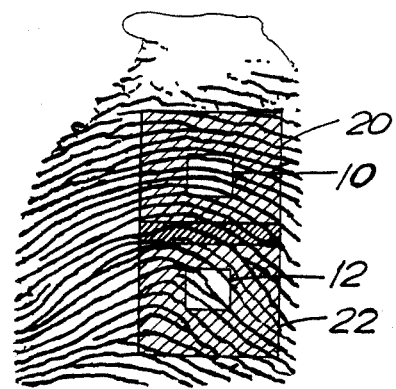
FIG. 1 is a schematic view of the two reference segments from the enrolled image overlaid onto the two domains from the input fingerprint image. The input image is shown in the background.

Referring now to the drawings and more particularly to FIG. 1, an enrolled fingerprint image is generated in accordance with known techniques, as shown, for example, in U.S. Pat. No. 4,322,163, issued Mar. 30, 1982. Two reference segment subfields 10 and 12 are extracted from the full field of the fingerprint image. Reference segments 10 and 12 are stored, in a conventional manner, as a series of ones and zeros pixels representing respectively light and dark pixels of the fingerprint image, which, in turn, correspond to ridge and valley locations of the fingerprint. In one embodiment, each reference segment 10 and 12 is a 32×32 pixel square having a center to center spacing of about seventy pixels. The reference segments 10 and 12 are identified in the storage system by their one and zero values and further by their location in the enrolled fingerprint image. The reference file thus consists of the segments 10 and 12 for each enrolled individual.

During enrollment, a pre-use verification analysis is made to confirm that the reference file will be effective in confirming the correct individual during a later access or verification use. What is done is that the individual being enrolled is requested to apply his or her finger to the input platen for the system a number of times; for example four times. The first application of the finger generates the reference file from which the reference segments 10 and 12 are extracted. Each subsequent application of the finger is then treated as a verification procedure in which the reference segments are correlated against the input image, exactly as would occur in a later verifiction routine, to determine whether or not the system properly positively identifies the individual involved. If this pre-use verification analysis identifies the individual in three successive verification routines, then the reference segments 10 and 12 are stored in the access control system as part of the reference file therein.

Each time a previously enrolled individual desires access to the system a verification fingerprint scan is made. The enrolled individual identifies him or herself by some additional means at the time that the verification scan is made to inform the access control system which of its stored reference segments to use in the verification process.

In verification, two domains 20 and 22 within the input image are captured. The center of each domain 20 and 22 in the input image nominally corresponds to the center of one of the reference segments 10, 12, respectively from the enrollment file.

The domains 20 and 22 must be substantially larger in size than the corresponding reference segments 10, 12 to assure that somewhere within the domain there will be a segment which correlates highly with the reference segment. The problem which gives rise to this requirement is the fact that each time the individual's finger is placed on a platen, there is likely to be a displacement of the fingerprint image relative to other times when the finger is placed on the platen. This relative displacement requires that a reference segment be scanned across a substantially larger domain in order to determine that position of the reference segment in which the greatest correlation occurs between reference file segment and the same size segment portion of the corresponding domain from the input image.

In one embodiment, each reference segment 10, 12 is a 32×32 pixel square while the corresponding domain 20 or 22 is a 91×91 pixel square.

DETERMINING POSITIONS AND VALUES OF MAXIMUM CORRELATION

Figure 3:
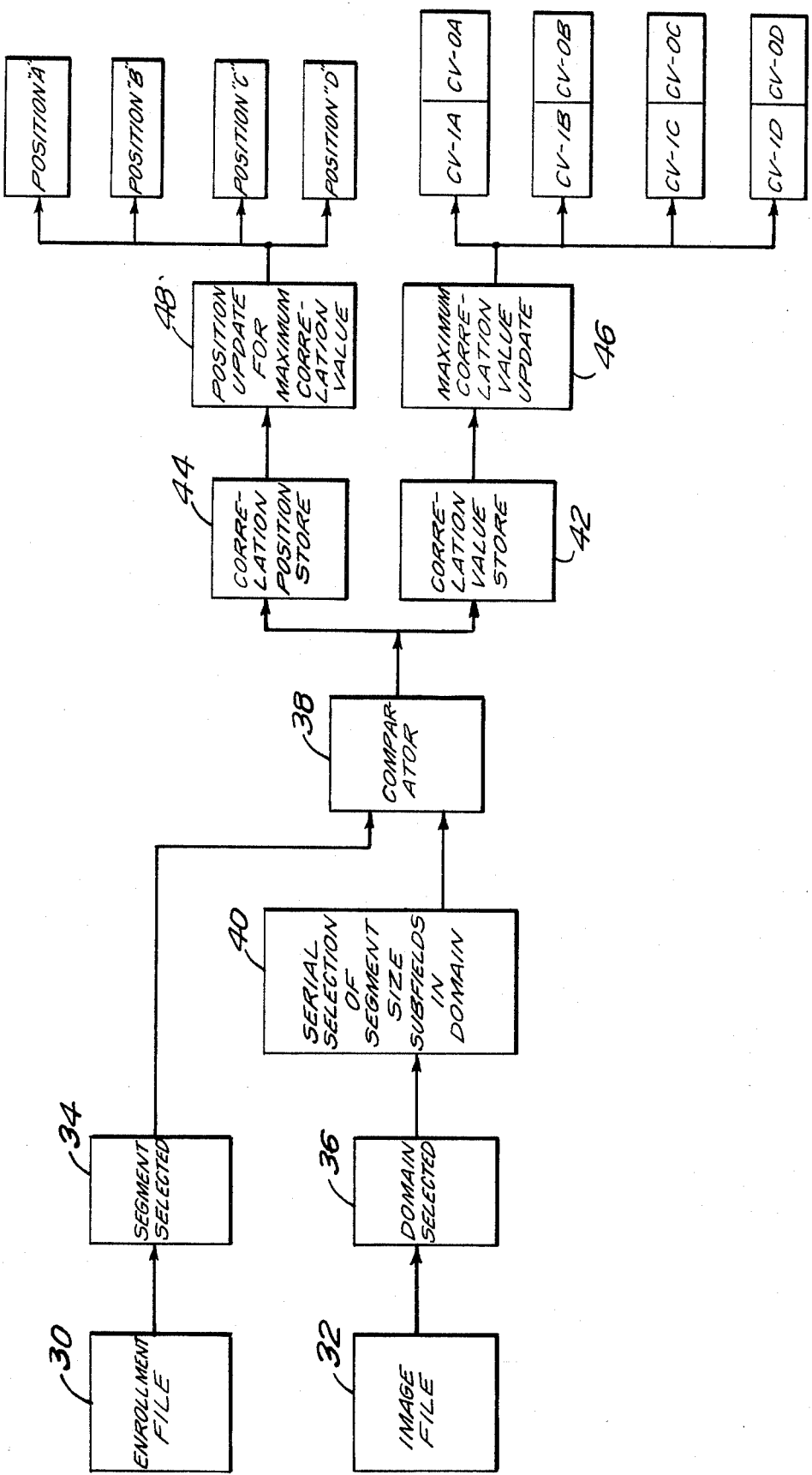
FIG. 3 is a block diagram illustrating the sequence of steps taken when scanning the segments across the domains to locate the positions "A", "B", "C" and "D" of maximum correlation between each segment and an underlying portion of the domain and to determine the correlation value (CVs) at each of these four positions.
Figure 4:
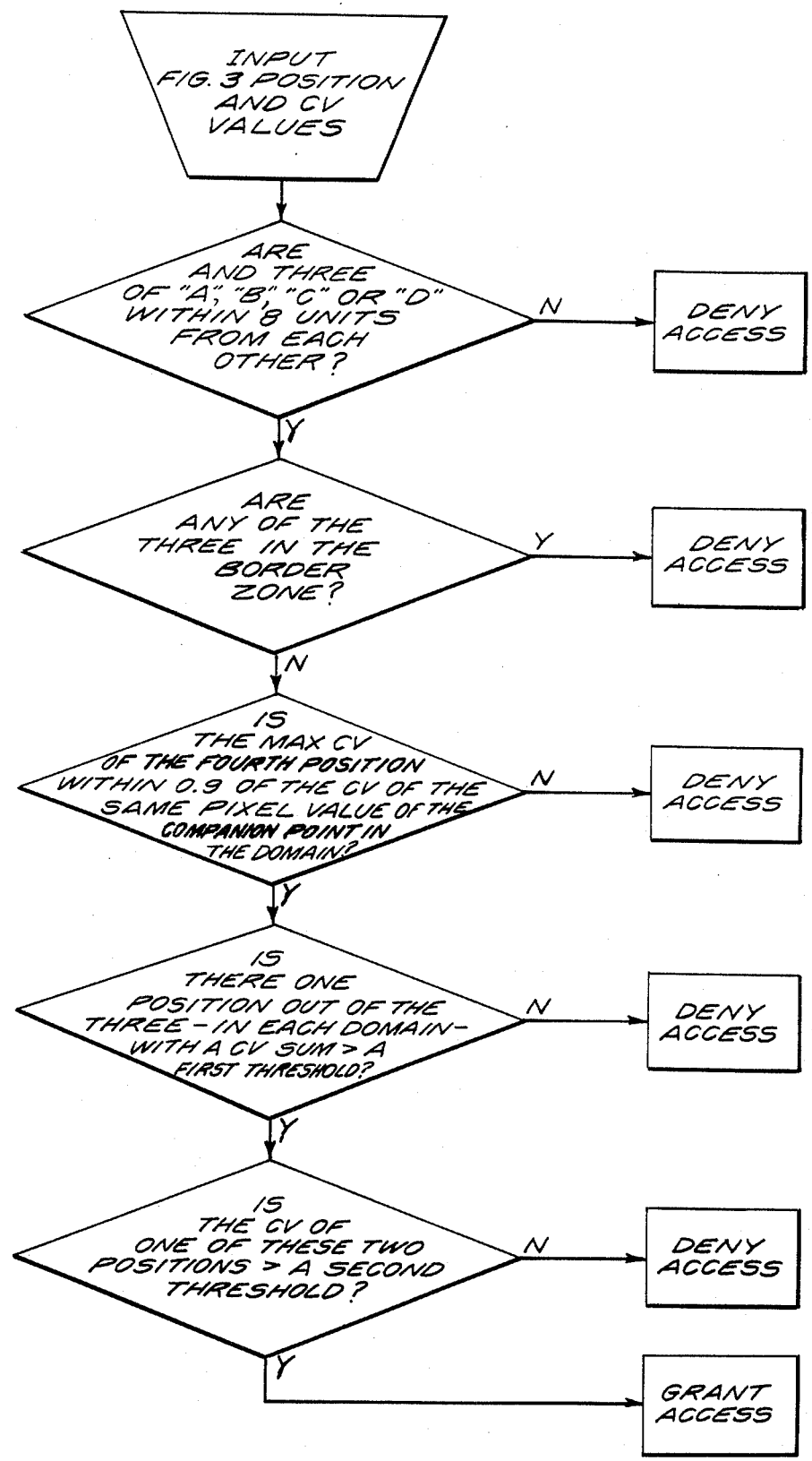
FIG. 4 is a flow chart illustration of the screening stages using the position and correlation value (CV) information provided by the scanning arrangement of FIG. 3.

Each reference segment 10, 12 of the reference file is scanned across the corresponding domain 20, 22 respectively and four significant positions are determined. The four significant positions are: the position of maximum correlation of ridge zones in each reference-domain pair and the position of maximum correlation of valley zones in each reference-domain pair. FIG. 3 indicates the sequence of steps taken to determine these four significant positions and the correlation valves at each position.

Figure 2:
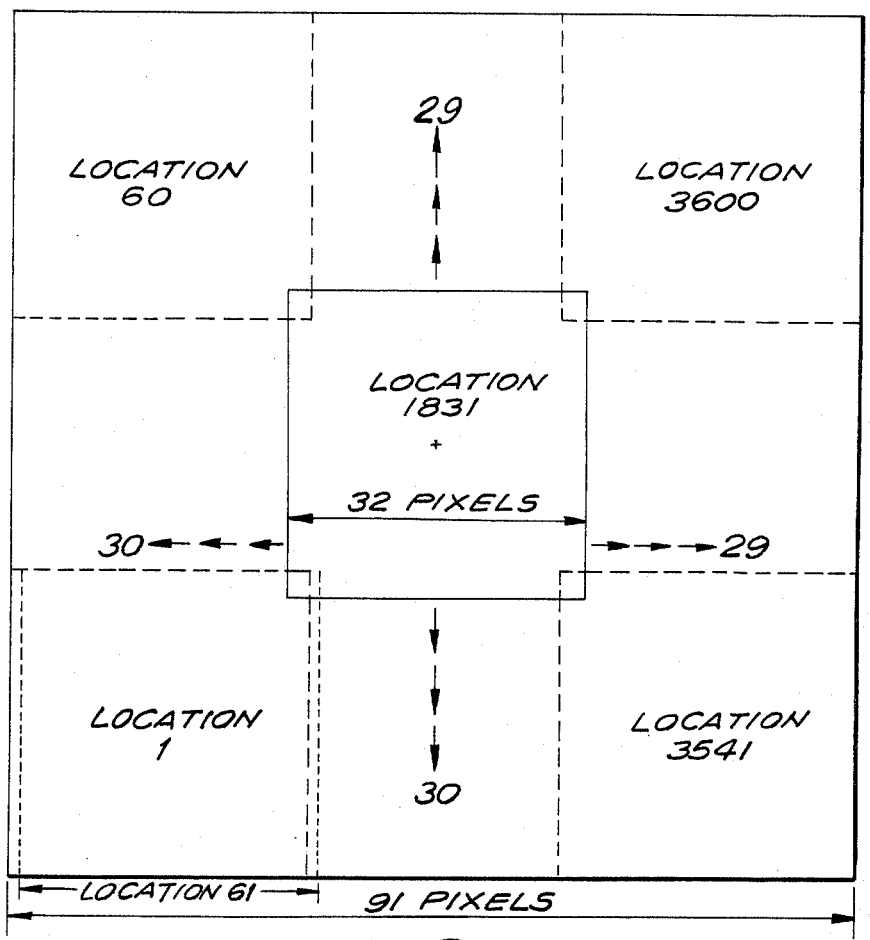
FIG. 2 is a schematic view illustrating the scanning of one of the reference segments across a corresponding input fingerprint domain.

As indicated in FIG. 2, the two significant positions of each reference segment are determined by scanning that reference segment across the associated domain in a predetermined manner. The reference segment 10 is first located at position "1", in the lower left hand corner of the corresponding domain 20. A determination is made as to the number of coincidents between ones pixels in the reference segment and the underlying 32×32 pixel portion of the domain. A second determination is made of the number of coincidents between the zeros pixels in the reference segment 10 and the underlying portion of the domain 20. These two coincidence scores are retained and will be referred to herein as correlation values (CVs). The reference segment 10 is then moved one pixel up to a position "2" and the two correlation values determined. This is continued by moving the reference segment one pixel at a time up from position "1" to position "60". The reference segment then returns to the bottom of the domain but is located one pixel to the right of position "1" so that position "61" overlaps position "1" as shown. The sequence is followed with the reference segments being positioned in the particular sequence shown by being displaced one pixel at a time, moving up. In this fashion the entire domain 20 is covered, in a predetermined sequence, with the reference segment 10 thereby being scanned over each of 3,600 overlapping test segments of the domain with which it is associated.

At each of these test segment positions, the two correlation values (CVs) indicated above are determined. The highest CVs are maintained in memory together with the location of the center of the reference segment where the high correlation values are obtained. At the end of the 3,600 test positions, there is in memory (a) a high ones correlation value together with the indication of the position of the center of the reference segment in the domain where that high ones value is obtained and (b) a high zeros correlation value together with the center position of the reference segment in the domain where that high zeros value is found. The reference segment position associated with the high ones correlation value may or may not be the same as the reference segment position associated with the high zeros correlation value.

If there is more than one high CV, the last to be found is retained and the prior one discarded. Hence it is important the test procedure be in a predetermined sequence.

Each of the four high CV positions are assigned x and y coordinates in terms of the position of the associated reference segments within their respective domains. These four positions are referenced to the center of the reference segment 10, 12 within the domain 20, 22 where the high correlation score is obtained. Since the position is referenced to the center of these reference segments, it can be appreciated that these x, y coordinates all appear within a zone of 60×60 pixels around the center pixel of the domain. For example, the center of the reference segment 10 in position "1" is deemed to have the coordinates 1, 1. The center of the reference segment in location 60 has the coordinates 1, 60. The coordinates 31, 31 designate the center of the domain and the coordinates 60, 60 designate the center of the reference segment location 3,600.

It must be kept in mind that the coordinate system used for the first domain is replicated in the second domain because what we are concerned with is the relationship of the reference segment to its corresponding domain. Thus the substantial center of the first domain and the substantial center of the second domain will both have the coordinates 31, 31 although these two substantial centers are spaced apart from one another by about 71 pixels in the image plane. Thus the two sets of x and y coordinates are transformed to the same coordinate plane.

FIG. 3 illustrates the manner in which the comparison of reference segment to image domain is made so as to provide these four positions and the correlation values for these four positions. The enrollment file 30 contains the two reference segments 10 and 12. The image file 32 contains the two domains 20 and 22. From these two files the corresponding segment and domain are selected as indicated in blocks 34 and 36. A comparator 38 compares the reference segment against each of the 3,600 same size segment locations on the corresponding domain. Accordingly, a computer controlled means 40 is provided for the serial selection of these segment size sub-fields in the domain 36 for serial application as one of the two inputs to the comparator 38.

The value and position of the zeros correlation and of the ones correlation for each sub-field/segment comparison are held in a temporary store 42 and 44 respectively to permit comparison with prior CV and position figures in the stores 46, 48 respectively. This permits updating the stores 46, 48 to provide holding only the maximum CV for the zeros and for the ones in the stores 46, 48. Specifically, in the scan of a single segment, such as a segment 10, over its corresponding domain 20, only the maximum correlation value for the zeros and the maximum correlation value for the ones is given import for purpose of the subsequent screening process. Accordingly, the update store 46 holds the maximum running ones correlation value and zeros correlation value during each scan. Correspondingly a position update store 48 holds the position (in x and y coordinates) of the maximum correlation values. Accordingly the storage units 42 and 44 are only for the purpose of permitting comparison of the most recent correlation value and its position against the magnitudes in the storage units 46 and 48 for the purpose of determining if those values have to be updated.

At the end of the scan of the first segment over the first domain, two positions are determined representing the position of maximum ones correlation value and the position of the maximum zeros correlation value. Similarly, in addition, the correlation values of both the ones and zeros at each of these two positions are retained in storage. A similar scan of the second segment 12 over the domain 22 will produce another two maximum correlation value positions and corresponding correlation values. In FIG. 3 these values are represented by twelve storage boxes along the right hand margin of FIG. 3. Specifically these values which are stored at the end of the scanning operation are:

Position "A" is represented by the x and y coordinates for the position of the maximum ones correlation in the first domain.

Position "B" is represented by the x and y coordinates for the position of the maximum zeros correlation in the first domain.

Position "C" is represented by the x and y coordinates for the position of the maximum ones correlation in the second domain.

Position "D" is represented by the x and y coordinates for the position of the maximum zeros correlation in the second domain.

CV-1A is the correlation value of the ones pixels at position A.

CV-0A is the correlation value of the zeros pixels at position A.

Similarly, the rest of the storage correlation values are correlation values of the ones pixels and the zeros pixels at the positions "B" "C" "D".

There are a number of screening stages to verify the input fingerprint image against the corresponding enrollment file. These stages employ the position of the two maximum ones correlation and two maximum zeros correlation as well as the correlation values at those positions. At each stage of the screening, if the input image data fails to meet the criteria, then verification is negatived and access is denied. These stages employing the position and correlation valves set forth above are taken in sequence and are as follows.

A FIRST SCREENING STAGE (POSITIONAL CLOSENESS)

The first stage of screening involves a determination that the x and y coordinates for the positions where the four maximum correlations are found have a certain closeness to one another in accordance with a particular criteria.

More specifically, the first screening test requires that any three of the positions "A", "B", "C" and "D" be within eight coordinate units from each other. This distance is measured on a diagonal. If more than one subset of three points meets the closeness criteria, the subset which is most tightly clustered (i.e., has the smallest aggregate of the distances between each two of the three points) comprises the points which will form the basis for the further screening tests.

If there are not three of these positions within eight units from each other, then access is denied. If there are at least three such positions, then the second screening stage is undertaken.

A SECOND SCREENING STAGE (BORDER EDIT)

The second screening stage is based on the observation that a large number of the false positive identifications which pass the first screening stage have the positions "A", "B", "C" and "D" located away from the center of the domains 20, 22.

More particularly, referring back to FIG. 2, it should be remembered that the $32 \times 32$ pixel reference segment is sequentially positioned in each of 3600 overlapping positions in the $91 \times 91$ pixel domain. The center point of each of those 3600 reference segment positions lies within a window of $60 \times 60$ pixels about the domain center. Accordingly each ones and zeros correlation value is referenced to one of the points in this $60 \times 60$ window. That $60 \times 60$ window is the basis for the coordinates that identify points "A", "B", "C" and "D" as defined above. The lower left hand corner of that window has the coordinate $x=1$ and $y=1$ and the upper right hand corner of that window has the coordinate $x=60$, $y=60$.

With that geometric image in mind, the second screening step can be readily understood. The criteria requires looking at the coordinates of each of the three positions that constitute the group that is within eight coordinate units of each other. These are the three positions identified at the first screening stage. If any one of the six x or y coordinates representing those three points has a value of less than four or greater than fifty-seven, then the verification is negatived and access is denied.

In effect, this says that if any one of the three positions is within a border zone having a thickness of three pixels the verification will be negatived.

A THIRD SCREENING STAGE (DEVIANT POINT CORRELATION VALUE)

The third screening stage looks to the fourth of the four positions "A", "B", "C" and "D". For example, if the three positions found in the first screening stage (which are within a distance of eight of one another) are the positions "A", "B" and "D", then the fourth position is "C".

The maximum correlation (CV) value that determines that fourth position is noted. If the fourth position is "C", then the ones correlation value for position "C" is noted. That correlation value is compared with the comparable correlation value of the other point from that domain. In the example of "C" being the fourth position, the ones correlation value for "C" is compared with the ones correlation value for the position "D". If these two ones correlation values differ by more than 10%, then the identification is negatived and access is denied. Specifically, with reference to FIG. 3, the criteria is that if [(CV of 1C)−(CV of 1D)]>0.1 (CV of 1C), then access is denied.

It should be kept in mind that if the fourth position were, for example, "B", then it is the zeros correlation value for "B" that is compared with the zeros correlation value for "A". If the fourth position were "A", then the ones correlation values of "A" and "B" would be compared. Similarly if the fourth position were "D", then the zeros correlation values for "C" and "D" would be compared.

In this fashion the fourth maximum correlation value has an effect on the identification.

If all four positions were required to be within a relatively tight distance of one another in stage one, that would be a much tighter screen. But in part because of the sequential technique in stage one of comparing the reference segment against overlapping domain positions, there is the risk that one of the highest correlation values will be a substantial distance from the others even though there is a correlation value near the other three which is just slightly under the correlation value of the fourth further removed point. Accordingly, it has been found preferable to employ only three of the positions for the first stage screening. But because that tends to be too loose a screen, this third stage provides a check to make sure that the fourth correlation value is not too different from the correlation value of the more closely associated positions. If the correlation value associated with the fourth position is very much different, then it suggests that there was not in fact a fourth point close to the other three points with a correlation value within hailing distance of their correlation values. Such indicates that the correspondence between the input image and the reference file image is not very good.

Thus, if the maximum CV associated with the fourth point (the ones correlation for C in this case) is greater than the CV for the same pixel value for the comparison point (the ones correlation for D in this case) by enough so that the difference between these two CVs is more than 10% of the ones CV for point C, then access is denied. A FOURTH SCREENING STAGE (SUMMED CV—FIRST THRESHOLD)

The fourth screening stage looks to the value of the correlations at the positions "A", "B", "C", and "D" and requires that certain of these correlation values meet a first threshold relative to perfect correlation.

If correlation were perfect at any one position, the sum of the ones correlation value and zeros correlation value at that position would be 1,024 because that is the number of pixels in a segment 10 or 12. A threshold value as a percent of this perfect correlation of 1,024 is established as a criteria. If this first threshold is 62%, then the threshold value for the sum of the ones and zeros correlation is 635.

In a currently tested embodiment, this fourth screening stage is applied only to the three positions identified in the first screening stage that are within a distance of eight of one another. As to these positions, for example "A", "B", and "D", this criteria requires that there be at least one summed correlation value (CV) in each domain equal to 635 or greater. In the example set forth above, if the three are "A", "B" and "D", this requires that the summed CV for "D" be 635 or greater and that the summed CV for either "A" or "B" be 635 or greater.

If the summed CV for one of the points in domain one (for example, CV-1B plus CV-0B) and the summed CV for one of the points in domain two (for example, CV-1D plus CV-0D) are each greater than 634, then the screening proceeds to the next step. But otherwise, access is denied. Thus access is denied if the summed CV for points A and B exceed 634, if the summed CV for "D" is less than 635.

A FIFTH SCREENING STAGE (SUMMED CV—SECOND THRESHOLD)

This fifth screening stage further requires that one of the two summed CVs that meet the first threshold of the fourth screening stage also meets a second threshold, which second threshold is higher than the first threshold. For example, if the second higher threshold is 68%, this would mean a summed correlation value of 697 or greater (68% of 1024=696.32). Accordingly, in the example given, if the summed correlation values for "D" and "B" were both 635 or greater, then one of those two must be 697 or greater.

If the summed CV for either "D" or "B" exceeds 696, access is granted. Otherwise, access is denied. By virtue of the fourth and fifth screening stages, the magnitude of the total correlation at these maximum correlation positions has an impact on identification.

POSITION OF REFERENCE SEGMENTS 10, 12

The position of the reference segments 10, 12 and of the domains 20, 22 in the field of pixels which constitutes the fingerprint image plane is predetermined as an established address in relation to the image buffer. The image buffer, in turn, has a set relationship to the platen to which the fingerprint is applied and which determines the fingerprint image. This pre-determined position of the segments and domains is constrained by the requirement that these segments and domains appear within the fingerprint of as large a population of individuals as possible. In particular, because some fingerprints are quite narrow compared to others, it is important that the segments and domains be predetermined, as shown in FIG. 1, toward the right of the fingerprint image because, in the embodiment involved, the individual's fingerprint is constrained to be against the right edge of the platen.

Accordingly, in an embodiment of this invention where the image plane is 192 wide (the x axis in FIG. 1) and 254 pixels high (the y axis in FIG. 1), it was determined that a desirable location is to have the second domain 22 start at least 33 pixels from the lowest pixel line in the image plane and for the two domains to be eleven pixels in from the right margin of the image plane. The two domains 20, 22 overlap by nineteen pixels in order to make sure that the upper end of the first domain 20 is always within a useful portion of the image.

As with all the other specific numerical criteria set forth in this disclosure, these numbers can be varied somewhat as a function of considerations such as the nature and the size of the population involved and the sizes of the reference segments 10, 12 and domains 20, 22.

REDUCTION OF TYPE II ERROR

The above system of criteria has a very low type I error and yet is a relatively simple system that does not require the selection, identification and correlation of fingerprint minutia. However, as a system it has a type II error (that is, false positive error) which may be unacceptable in some situations. For example, depending on the situation, it might have a type II error a large as five percent (5%).

A simple technique of substantially reducing this Type II error without adding complexity to the system is to incorporate the requirement that at least two fingers of the individual seeking admission must be successfully identified in the system. Because the system operates so fast, two finger cascading is acceptable. If the type II error with a single finger is in the range of 5%, then it might be expected that the type II error in a system which requires that two separate fingers must be separately identified would be in the range of one four-hundredth of one percent (0.0025%).

Of course, this requirement that two separate fingers be individually identified to obtain access, increases the type I error. But this requirement simply makes the very low type I error additive so that the type I error remains low.

However, type I error can be brought down appreciably by permitting the individual to go through the routine of applying the two fingers in succession either a second time or even a third time. If there is a positive identification at any one of the three sets of two finger applications, then the individual is admitted. This will substantially reduce type I error while not being additive with respect to type II error.

A cascading of two separate fingers requires that both finger A and finger B be positively identified.

Further, by permitting access if any one of three attempts is successful, the effect on the overall type I error rate is to substantially reduce that error rate while having only minor effect on a type II error rate, which has been substantially reduced because of the two finger cascading requirement.

Thus, two finger cascading in combination with multiple alternative attempt affects a significant improvement in both type I and type II errors.

Further, training of and practice by the individual in placing his or her finger carefully on the platen will greatly improve the false rejection type I error.

Although the invention has been described in connection with a specific embodiment, it should be remembered that there are various modifications that can be made which are encompassed by the claims.

For example, the particular values of various criteria can be modified to obtain a range of results. Thus Type I error might be reduced by increasing the value of the critical distance (that is, the eight coordinate units) between the three locations in the first screening stage. Type II error might be reduced by decreasing that critical value. Similarly, changes in the second and third screening stage criteria would also tend to affect both types of errors, a specific change generally increasing one type of error and decreasing the other type of error. Perhaps more importantly, there is a trade-off between the criteria of these three scanning stages so that a change in the critical value of one of these stages might call for a change in the critical value in another one of the stages. Both experience and the requirements of a particular installation will dictate such modifications to the specific example provided.

In addition, and more generally, it will be possible to modify the nature of these criteria by establishing other criteria for the relationship between the maximum correlation points "A", "B", "C" and "D" to obtain comparable results.

What we claim is:

1. The method of fingerprint verification by comparison of a reference fingerprint image against an input fingerprint image wherein each image is composed of a field of pixels having first and second values representing respectively fingerprint ridge and valley pixels comprising the steps of:

providing at least first and second reference segment images representing subfields from a reference fingerprint, providing at least first and second domain images representing subfields from an input fingerprint, said domain images being substantially larger than said reference segment images, scanning said first reference segment image across said first domain image and scanning said second reference segment image across said second domain image to determine significant positions, said significant positions constituting locations of maximum correlation for each reference segment image/domain image pair between pixels having said first value and also locations of maximum correlation for each reference segment image/domain image pair between pixels having said second value, and verifying the input fingerprint from which said domain images are extracted as corresponding to the reference fingerprint from which said reference segment images are extracted by subjecting at least one of said significant locations to pre-determined positional criteria.

2. The method of claim 1 wherein said significant positions include:

a first position being the position of said first reference segment image in said first domain image where the maximum correlation is found between pixels having said first value, a second position being the position of said first reference segment image in said first domain image where the maximum correlation is found between pixels having said second value, a third position being the position of said second reference segment image in said second domain image where the maximum correlation is found between pixels having said first value, and, a fourth position being the position or said second reference segment image in said second domain image where the maximum correlation is found between pixels having said second value.

3. The method of claim 2 wherein:

the centers of said first and second reference segment images have substantially the same positional location relative to the reference fingerprint as do the centers of said first and second domain images to the input fingerprint being verified.

4. The method of claim 2 wherein said step of determining said four significant positions is performed by the steps of:

systematically scanning each reference segment image across the corresponding domain image in a series of predetermined overlapping test locations, determining in each test location a score of ones pixel correlation and a score of zeros pixel correlation, and storing for reference the positions of maximum ones pixel correlation and maximum zeros pixel correlation for each reference segment image/domain image pair.

5. The method of claim 4 wherein said four significant positions are given x and y coordinates in terms of their locations within their respective domain images, said four sets of coordinates being referenced to the same coordinate plane.

6. The method of claim 5 further comprising the step of:

storing for reference the magnitudes of the ones correlation values and the zeros correlation values at each of said four positions.

7. The method of claim 5 wherein said step of verifying requires that three of said four significant positions be positioned in said coordinate plane within a predetermined distance of one another.

8. The method of claim 7 wherein each step of verifying further requires that said three closely associated significant positions be a predetermined distance away from the border of said coordinate plane based on the dimension of said domain images.

9. The method of claim 7 wherein said step of verifying further requires that said maximum correlation value of said fourth significant position be within a predetermined magnitude or ratio of the correlation value of the same pixel value of the other significant position in the domain of said fourth position.

10. The method of claim 8 wherein said step of verifying further requires that said maximum correlation value of said fourth significant position be within a predetermined magnitude or ratio of the correlation value of the same pixel value of the other significant position in the domain of said fourth position.

11. The method of claim 7 wherein said step of verifying further requires that one of said three of said significant positions within said predetermined distance which is in said first domain has a correlation sum that exceed a first threshold and that one of said three significant locations within said predetermined distance that is in said second domain also exceeds said first threshold.

12. The method of claim 8 wherein said step of verifying further requires that one of said three of said significant positions within said predetermined distance which is in said first domain has a correlation sum that exceed a first threshold and that one of said three significant locations within said predetermined distance that is in said second domain also exceeds said first threshold.

13. The method of claim 9 wherein said step of verifying further requires that one of said three of said significant positions within said predetermined distance which is in said first domain has a correlation sum that exceed a first threshold and that one of said three significant locations within said predetermined distance that is in said second domain also exceeds said first threshold.

14. The method of claim 10 wherein said step of verifying further requires that one of said three of said significant positions within said predetermined distance which is in said first domain has a correlation sum that exceed a first threshold and that one of said three significant locations within said predetermined distance that is in said second domain also exceeds said first threshold.

15. The method of claim 11 where said step of verifying further requires that the correlation value of one of the two positions that exceeds said first threshold also exceeds a second threshold greater than said first threshold.

16. The method of claim 13 wherein said step of verifying further requires that the correlation value of one of the two positions that exceeds said first threshold also exceeds a second threshold greater than said first threshold.

17. The method of claim 14 where said step of verifying further requires that the correlation value of one of the two positions that exceeds said first threshold also exceeds a second threshold greater than said first threshold.

18. The method of claim 1 wherein the subfield of the domain image is approximately an order of magnitude greater in area than the subfield of the reference segment image.

19. The method of claim 7 wherein the subfield of the domain image is approximately an order of magnitude greater in area than the subfield of the reference segment image.

20. The method of claim 1 wherein said first and second domain images overlap.

21. The method of claim 7 wherein said first and second domain image overlap.

22. The method of claim 4 wherein each of said reference segment image is scanned across the respective domain image in a predetermined pattern and in case of coincident maximum correlation values, the last in sequence is deemed to be one of said significant locations.

23. The method of claim 7 wherein each of said reference segment images is scanned across the respective domain image in a predetermined pattern and in case of coincident maximum correlation values, the last in sequence is deemed to be one of said significant locations.

24. The method of claim 1 further comprising the steps of:

establishing said reference segment images by first establishing an initial set of reference segment images for a subject finger, then verifying repeated applications of said subject finger in accordance with the method of claim 1, and retaining said initial set in a reference file only if positive verification is obtained in a predetermined number of said repeated applications.

25. The method of claim 7 further comprising the steps of:

establishing said reference segment images by first establishing an initial set of reference segment images for a subject finger, then verifying repeated applications of subject finger in accordance with the method of claim 1, and retaining said initial set in a reference file only if positive verification is obtained in a predetermined number of said repeated applications.

26. The method of claim 1 further comprising the steps of:

applying the steps of claim 1 to verification of first and second input fingerprints taken from different first and second fingers, and providing identification of the subject having said first and second fingerprints if and only if said step of verifying is successfully completed in connection with both of the fingerprint images.

27. The method of claim 7 further comprising the steps of:
applying the steps of claim 7 to verification of first and second input fingerprints taken from different first and second fingers, and
providing identification of the subject having said first and second fingerprints if and only if said step of verifying is successfully completed in connection with both of the fingerprint images.

28. The method of claim 1 further comprising the steps of:
applying the steps of claim 1 to separate applications of the subject's input fingerprint, and
providing identification if any one of the applications is verified by said step of verifying.

29. The method of claim 7 further comprising the steps of:
applying the steps of claim 1 to separate applications of the subject's input fingerprint, and
providing identification if any one of the applications is verified by said step of verifying.

30. The system of verifying an input fingerprint image by comparison of a reference fingerprint image against an input fingerprint image wherein each image is composed of a field of pixels having first and second values representing respectively fingerprint ridge and valley pixels comprising:
means to establish at least first and second reference segment images representing subfields from a reference fingerprint,
means to establish at least first and second domain images representing subfields from an input fingerprint, said domain images being substantially larger than said reference segment images,
scanning means for scanning said first reference segment image across said first domain image and scanning said second reference segment image across said second domain image to determine significant positions, said significant positions constituting locations of maximum correlation for each reference segment image/domain image pair between pixels having said first value and also locations of maximum correlation for each reference segment image/domain image pair between pixels having said second value, and
means to verify the input fingerprint from which said domain images are extracted as corresponding to the reference fingerprint from which said reference segment images are extracted by subjecting at least one of said significant locations to pre-determined positional criteria.

31. The combination of claim 30 further comprising:
first storage means for storing the maximum ones correlation position and maximum zeros correlation position for each of said reference segment image/domain image pair.

32. The combination of claim 31 further comprising:
second storage means for storing the magnitude of the correlation values for each position stored in said first storage means.

* * * * *